United States Patent Office 3,082,757
Patented Mar. 26, 1963

3,082,757
DISPOSABLE CHARCOAL GRILL COVER
Donald G. Hohe, 566 Chestnut St., Emmaus, Pa.
Filed Jan. 30, 1962, Ser. No. 169,906
1 Claim. (Cl. 126—25)

This invention relates to cooking ware and, more particularly, to a disposable charcoal grill cover.

With the development of modern "suburbia," the pastime of charcoal broiling meat and other food has attained an all time high in popularity among suburban Americans. In many an American family it has become a weekend ritual, weather permitting, for the head of the household to don his white chef's hat and take to the outdoors to assume the responsibility for preparing the dinner meal by the process of charcoal broiling. To meet the demand of the public in this regard, industry has made available for consumption apparatus ranging widely in complexity and price. All of these, however, embody in one form or another, a container or fire box to house the burning charcoal and a grill to support the meat above the charcoal in broiling position. The grill is generally constructed of wrought iron bars or cast iron forming parallel or circular grates and is intended for permanent, repeated use.

Removing the burnt pieces of food, grease, and juices deposited upon the grill surfaces during the broiling operation proves an arduous and often vexatious task which is in sharp contrast to the tone of convenience, made possible by contemporary innovations, that marks our daily experiences generally. It is small wonder, then, that a disposable food wrapper having openings through it to permit charcoal broiling of food held within the wrapper should have been conceived and disclosed in Patent 2,999,452, issued September 12, 1961, to T. A. Hardy.

A food wrapper that can be made available at a sufficiently small cost to make disposal after a single use practical will by necessity be constructed of such thin gauge metal that some supplemental supporting structure is necessitated. Thus, Hardy, in his patent, teaches that his disposable wrapper can be supported either by completely surrounding the food with the wrapper and inserting a long pair of tongs, which can be held over the fire manually from the far end of the tongs, through the mesh of the wrapper or by placing the disposable wrapper directly on the permanent grill of existing charcoal broiling equipment.

The former of these is objectionable because it requires the continual attention of the chef to hold the enfolded food over the charcoal fire and causes existing, often elaborate and expensive equipment to lie idle to the chargin of its purchaser. Use of the latter means of support tends to defeat the very purpose the disposable wrapper is designed and intended to accomplish, viz., to obviate cleaning the grill surface employed to support the food. Although food is prevented from sticking to the permanent grill in the latter case as pointed out by Hardy, juice and grease excreted from the broiling food precipitate upon the grill and adhere and cake thereto due to the high ambient temperature. The food deposited on the grill in this manner makes cleaning the permanent grill necessary. This is attended by substantially the same degree of inconvenience and physical exertion that results from placing the food directly on the permanent grill without resort to the disposable wrapper.

It is, therefore, the object of the present invention to improve the effectiveness of disposable apparatus used in connection with permanent, reusable charcoal broiling equipment.

In accordance with the above object, a permanent, reusable grill that forms a part of a charcoal broiler is provided with a disposable grill cover constructed of thin gauge metal and having a pattern of grate bars congruent with the pattern of grate bars of the permanent grill. When the grill cover is fitted over the permanent grill and the openings or mesh therein are aligned with the corresponding openings of the permanent grill, the surface of the permanent grill is completely protected from the grease and juices of the food generated by broiling that would otherwise be deposited. Thus, cleaning of the permanent grill is rendered unnecessary in toto by practicing the invention.

According to a feature of the invention, after alignment between the pattern of grate bars of the grill cover and the pattern of grate bars of the permanent grill is established and the grill cover is in intimate contact with the permanent grill, such alignment is maintained and slippage of the grill cover with respect to the permanent grill is prevented by tabs appended to the grill cover extending perpendicularly from the edges of several of the grate bars on the grill cover. These tabs can be used on all edges of all the grate bars of the grill cover, in which case they also shield the vertical surfaces of the permanent grill from the grease and juices of the food being broiled.

The above and other features will be more fully described in the following detailed description taken in conjunction with the drawing in which.

Figure 1:
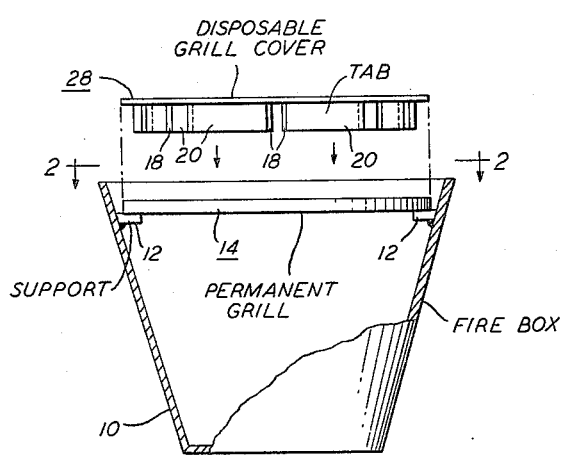
FIG. 1 shows a disposable grill cover according to the invention in position to be fixed to permanent charcoal broiling equipment.
Figure 2:
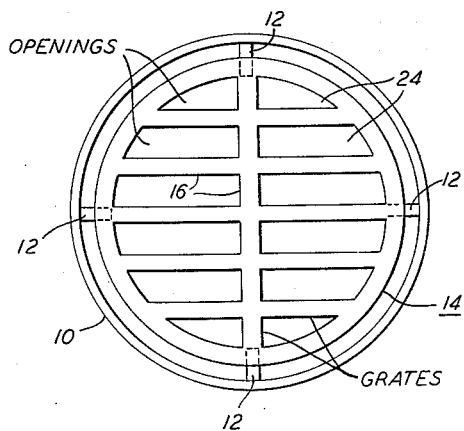
FIG. 2 is a plan view of the permanent charcoal broiling equipment of FIG. 1.

In FIG. 1 permanent, reusable charcoal broiling equipment comprising a fire box 10 for containing burning charcoal and a permanent grill 14, made of heavy grade cast or wrought iron, held in place at the mouth of fire box 10 by supporting members 12 is illustrated. FIG. 2 discloses that permanent grill 14 is laid out into a pattern of grate bars 16, with openings or mesh 24 resulting between grate bars 16. The food being broiled is exposed directly to the smoke and fire from the charcoal through openings 24.

Figure 3:
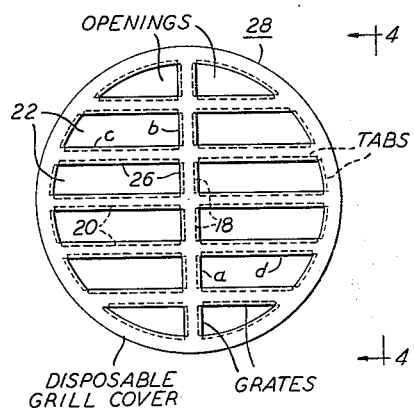
FIG. 3 is a plan view of the disposable grill cover of FIG. 1.

A grill cover 28, constructed of thin gauge metal, e.g., tenacious aluminum foil, is illustrated in FIG. 1 above permanent grill 14. The pattern of grate bars 26 of grill cover 28 is congruent with the pattern of permanent grill 14, as is indicated by comparing the plan view of grill cover 28 in FIG. 3 with that of permanent grill 14 in FIG. 2. When grill cover 28 is fitted flush against and on top of permanent grill 14, grate bars 26 are, therefore, aligned with grate bars 16 and openings 22 are aligned with openings 24. As a result, permanent grill 14 is completely shielded from precipitating juices and grease excreted by the broiling food and no cleaning of permanent grill 14 is required. In addition, since openings 22 are aligned with openings 24, optimum direct exposure of the food to the burning charcoal is realized so that the full effect of charcoal broiling can be given to the meat.

Figure 4:
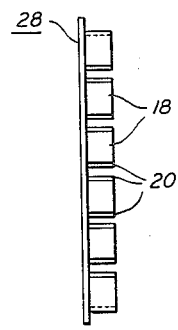
FIG. 4 is a side elevation view of the disposable grill cover.

Tabs 18 and 20, situated perpendicular to each other, extend from the edges of grate bars 26 perpendicular to the horizontal surfaces of grill cover 28, as shown by FIGS. 1 and 4. Tabs 18 and 20 fit into openings 24 when grill cover 28 is placed over and in intimate contact with permanent grill 14 and serve to shelter the vertical surfaces of permanent grill 14 from the grease and juice of the food being broiled. Tabs 18 and 20 are in intimate contact with the vertical surfaces of permanent grill 14 and, therefore, prevent slippage of grill cover 28 with respect to permanent grill 14. Consequently, grate bars 26 stay aligned with grate bars 16 while food is being broiled by means of the described equipment. To maintain alignment of grate bars 26 with grate bars 16, however, tabs 18 and 20 are not required for all edges of grate bars 26. For example, tabs 18 on the edges marked $a$ and $b$ in FIG. 3 and tabs 20 on the edges marked $c$ and $d$ in FIG. 3 would be sufficient to prevent slippage and retain alignment. Tabs 18 and 20 on all edges of grate bars 26 merely provide more effective protection of permanent grill 14, and in some applications conceivably may not be necessary.

It will be understood that the invention can be practiced in connection with a permanent grill having any grate pattern. For example, concentric circular grate patterns and parallel grate patterns, as distinguished from the crossed grate pattern shown in the drawing, are also commonly found on permanent grills presently available.

What is claimed is:

Charcoal broiling apparatus comprising a fuel container having an open top, a permanent, reusable grill the grate bars of which form a pattern, means for supporting said grill adjacent said open top, and a disposable grill cover constructed of thin heat-conducting material, said grill cover having a pattern of grate bar cover portions respectively congruent with the top and the sides only of the grate bars of said permanent grill.

References Cited in the file of this patent

UNITED STATES PATENTS

| | | |
|---|---|---|
| 1,301,197 | Tully | Apr. 22, 1919 |
| 2,806,227 | Arbetter | Sept. 17, 1957 |
| 2,849,949 | Trachtman | Sept. 2, 1958 |

OTHER REFERENCES

New Products Digest Publication, February 1956, published in Austin, Texas, Box 2246, page 34 relied upon.